United States Patent
Lin et al.

(10) Patent No.: US 7,591,170 B2
(45) Date of Patent: Sep. 22, 2009

(54) ROUGH ROAD DETECTION SYSTEM

(75) Inventors: Jian Lin, Beverly Hills, MI (US); Yong Xu, Ann Arbor, MI (US); Wenbo Wang, Novi, MI (US); Michael R. Grimes, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 95 days.

(21) Appl. No.: 11/625,834

(22) Filed: Jan. 23, 2007

(65) Prior Publication Data

US 2008/0173081 A1   Jul. 24, 2008

(51) Int. Cl.
*G01M 19/00* (2006.01)
(52) U.S. Cl. ...................................... 73/105; 73/114.25
(58) Field of Classification Search ................... 73/105, 73/114.02, 114.03, 114.04, 114.05, 114.24, 73/114.25
See application file for complete search history.

(56) References Cited

U.S. PATENT DOCUMENTS

| 5,381,688 | A | * | 1/1995 | Ikeda et al. ................... 73/105 |
| 5,507,180 | A | * | 4/1996 | Tomisawa ................. 73/114.12 |
| 5,687,692 | A | * | 11/1997 | Togai et al. .................. 123/436 |
| 7,240,540 | B2 | * | 7/2007 | Assaf et al. .................... 73/105 |
| 7,299,687 | B2 | * | 11/2007 | Hernandez ............... 73/114.12 |
| 7,325,446 | B1 | * | 2/2008 | Assaf et al. .............. 73/114.12 |
| 2003/0065435 | A1 | * | 4/2003 | Krueger et al. ................. 701/82 |
| 2003/0225497 | A1 | * | 12/2003 | Whinnery ..................... 701/49 |
| 2006/0136111 | A1 | * | 6/2006 | Robert et al. .................. 701/65 |
| 2006/0288767 | A1 | * | 12/2006 | Hernandez ................. 73/117.3 |
| 2007/0095130 | A1 | * | 5/2007 | Assaf et al. .................... 73/104 |
| 2008/0011069 | A1 | * | 1/2008 | Assaf et al. ................. 73/117.3 |

* cited by examiner

*Primary Examiner*—Eric S McCall

(57) ABSTRACT

A rough road detection system includes an engine speed module, a feature space module, a normalization module, and a rough road module. The engine speed module generates an engine speed signal based on a crank signal. The feature space module generates a feature space signal based on the engine speed signal. The normalization module generates a normalized signal. The normalized signal is based on the feature space signal and a normalization value that varies in accordance with the engine speed signal. The rough road module determines whether a rough road condition exists based on the normalized signal.

24 Claims, 4 Drawing Sheets

ROUGH ROAD DETECTION SYSTEM

FIELD OF THE INVENTION

The present invention relates to vehicles, and more particularly to a method and apparatus to detect when a vehicle is traversing a rough road.

BACKGROUND OF THE INVENTION

Vehicles include an internal combustion engine that generates drive torque. More specifically, the engine draws in air and mixes the air with fuel to form a combustion mixture. The combustion mixture is compressed within cylinders and is combusted to drive pistons that are slidably disposed within the cylinders. The pistons rotatably drive a crankshaft that transfers drive torque to a transmission and wheels. When the engine misfires, the combustion mixture of a cylinder does not combust at all or only partially, and may cause engine vibration and driveline oscillation.

Engine control systems often include misfire detection systems that determine when the engine misfires. The engine control system can adjust engine operation to reduce engine misfire, thereby improving engine performance and vehicle drivability. Some road conditions can cause the engine control system to incorrectly register a misfire event when one has not actually occurred. For example, rough roads can induce feedback torque on the wheels that can affect rotation of the crankshaft. Abnormal crankshaft rotation is one characteristic of an engine misfire event.

Some misfire detection systems identify misfire events based on changes in engine speed with respect to a reference. The reference represents expected changes in speed of a normal engine operating in similar conditions and may be obtained experimentally by running a vehicle at different operating conditions without misfire. When misfire occurs, the drop in engine torque produces a corresponding drop in engine speed. This speed change is sometimes greater than changes in a reference.

Rough roads also produce changes in engine speed that are similar in magnitude to those generated by engine misfire events. This poses a problem for engine misfire detection systems that rely on changes in engine speed to detect engine misfire events. To prevent the systems from generating false misfire events due to rough roads, the misfire detection system may be disabled when rough roads are detected.

SUMMARY OF THE INVENTION

A rough road detection system according to the present invention includes an engine speed module, a feature space module, a normalization module, and a rough road module. The engine speed module generates an engine speed signal based on a crank signal. The feature space module generates a feature space signal based on the engine speed signal. The normalization module generates a normalized signal. The normalized signal is based on the feature space signal and a normalization value that varies in accordance with the engine speed signal. The rough road module determines whether a rough road condition exists based on the normalized signal.

In other features, the rough road module determines that the rough road condition exists when the normalized signal exceeds a rough road threshold.

In yet other features, the engine speed module generates a sampled signal based on the engine speed signal. A filter module generates a filtered signal based on components of said sampled signal that do not exceed a rough road frequency. The filter module generates a vector signal based on the filtered signal. The filter module generates a reduced data signal based on the vector signal. The normalization module generates an energy signal based on the feature space signal. The normalized signal is based on the energy signal. The feature space signal is a frequency domain signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
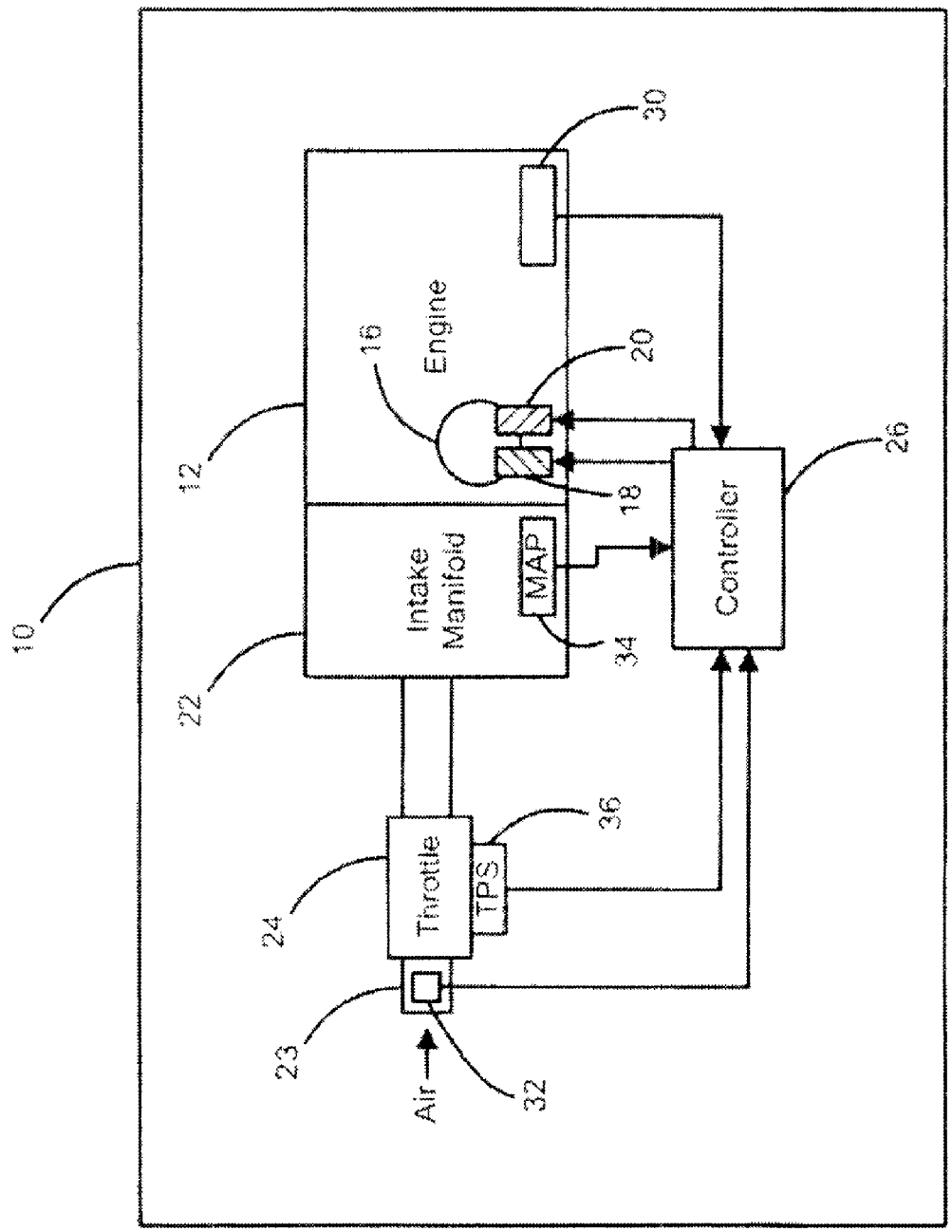
FIG. 1 is a functional block diagram of a vehicle implementing a rough road detection system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring to FIG. 1, a vehicle 10 is shown that includes an engine 12. The engine 12 includes a cylinder 16 having an associated fuel injector 18 and spark plug 20. Although a single cylinder 16 is shown, it can be appreciated that the engine 12 may include multiple cylinders 16 with associated fuel injectors 18, spark plugs 20, and intake and exhaust valves (not shown). For example, the engine 12 may include 4, 5, 6, 8, 10, or 12 cylinders 16. Air is drawn into an intake manifold 22 of the engine 12 through an inlet 23. A throttle 24 regulates the air flow into the intake manifold 22. Fuel and air are combined in the cylinder 16 and are ignited by the spark plug 20. Inlet and exhaust valves (not shown) control entry and exit of the air/fuel mixture and exhaust gases, respectively. Pushrods and/or one or more overhead cams with cam lobes can be used to open and close the intake and exhaust valves.

A controller 26 communicates with a crank position sensor 30 that generates a crank position signal based on rotation of a crankshaft. The controller 26 also communicates with a mass air flow (MAF) sensor 32 and manifold absolute pressure (MAP) sensor 34, which generate MAF and MAP signals, respectively. The controller 26 additionally communicates with a throttle position sensor (TPS) 36 that generates a TPS signal.

The crank position sensor 30 may be responsive to a toothed wheel (not shown) that rotates with the crankshaft. The toothed wheel includes a plurality of equally spaced teeth that radially extend therefrom. At least one tooth may be missing to define a gap. For example, the toothed wheel can include teeth that are sufficiently sized and spaced to accommodate 60 teeth. However, two teeth are missing for an actual total of 58 teeth disposed about the toothed wheel. The missing teeth define the gap. In this example, each tooth corresponds to 6° of rotation of the crankshaft (i.e., 360°/60 teeth). The gap corresponds to a rotational position of the crankshaft relative to a piston position within a cylinder. For example, the end of the gap can indicate that a particular piston is at top-dead-center (TDC) within its cylinder.

A pulse train is generated as the individual teeth rotate past the crank position sensor 30. Each pulse within the pulse train corresponds to a tooth of the toothed wheel. For the exemplary toothed wheel described above, each pulse corresponds to 6° of crankshaft rotation. The engine speed in revolutions per minute (RPM) is determined based on the pulse train. While a particular method is described, skilled artisans will appreciate that other systems and methods for sensing engine speed may be used.

The controller 26 implements a rough road detection system of the present invention to determine whether the vehicle 10 is experiencing a rough road condition (i.e., traveling on a rough road) based in the crank position signal. More specifically, the system determines event-domain instantaneous engine speed, which is defined as the amount of time required for the crankshaft to rotate through a particular period (e.g., 30°, 60°, 90°, 120°). For example, if a period of 30° is used, the controller 26 determines the amount of time associated with 5 pulses in the pulse train (i.e., 5 pulses×6°/pulse=30°).

The system samples the event-domain engine speed and a low-pass filter removes frequency components outside of a rough road frequency range. The remaining samples are sampled for a predetermined period to create a vector. The vector is sampled at a sampling rate greater than or equal to a Nyquist frequency of the samples to reduce the number of samples. The reduced number of samples are converted into frequency domain samples and summed over a frequency range. The summed samples are normalized by dividing with a normalization value that varies in accordance with engine speed. The normalized samples are compared to a threshold to determine whether a rough road condition exists. If the vehicle 10 is experiencing a rough road condition, the controller 26 disables an engine misfire detection system. In this manner, false misfire indications are reduced as a result of the rough road condition. While engine speed is used to describe the present invention, one skilled in the art will appreciate that vehicle speed may be used in accordance with the present invention.

Figure 2:
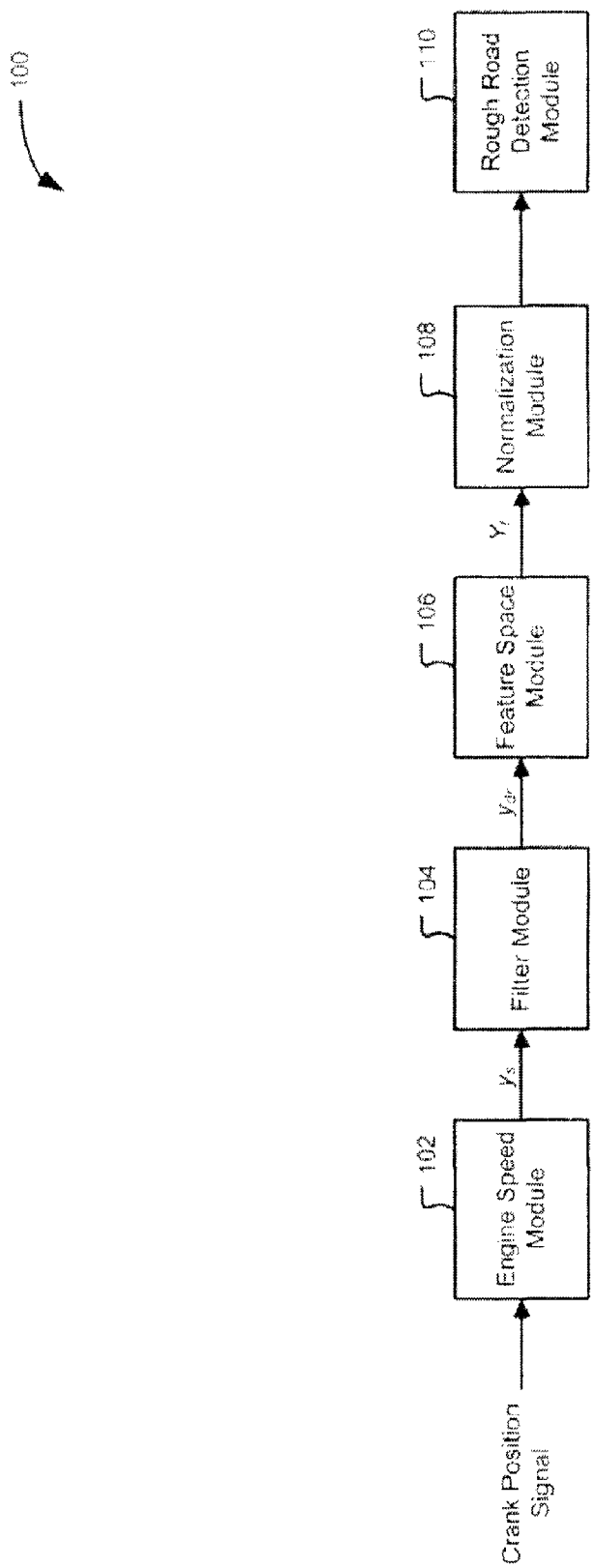
FIG. 2 is a functional block diagram of the rough road detection system of the present invention.

Referring now to FIG. 2, a rough road detection system 100 includes an engine speed module 102, a filter module 104, a feature space module 106, a normalization module 108, and a rough road detection module 110.

The engine speed module 102 calculates engine speed based on a time lapse between teeth of a target wheel and generates an engine speed signal. The engine speed signal may be characterized by the following equation:

$$ES = \frac{60}{N * dt}$$

where N is the number of teeth of the target wheel and dt is the time lapse between the teeth.

The engine speed module 102 samples the calculated engine speed using a fixed sampling rate and generates a sampled signal. The sampled signal is a time-domain discrete engine speed signal having equally spaced samples. For example, if the sampling frequency is 1,000 samples/sec, the separation between samples is the sampling period, $T_s=1/f_s=1$ millisecond. The sampled signal may be characterized by the following equation:

$$y_s = \sum_{k=0}^{N_s} ES(kT_s)$$

where $y_s$ is the sampled signal, ES is the engine speed signal, $T_s$ is a sampling period, and $N_s$ is a total number of samples.

The filter module 104 is used to remove components outside of a rough road frequency range and generates a filtered signal. The rough road frequency range is typically below 10 Hz. Therefore, a digital low-pass filter can be used to remove unwanted high frequency components. The low pass filter may be characterized by the following equation:

$$y = \sum_{n=0}^{m} b_n y_s(k-n)$$

where y is the filtered signal, $y_s$ is the sampled signal, m is the number of filter stages or taps, k is the sample number (1,2, 3 . . . ), and $a_n$ and $b_n$ are filter coefficients.

The filter module 104 assembles samples of the filtered signal for a buffer period to form a vector having N dimensions and generates a vector signal. In a preferred embodiment, the buffer period is one second. The vector signal may be characterized by the following equation:

$$y_b = [y_0 y_1 \ldots y_N]$$

where $y_b$ is the vector signal, $y_0 y_1 \ldots y_N$ are data components of the filtered signal, and N is the number of samples to be assembled. Thus, the vector signal is a N-dimensional vector that is formed with samples of the filtered signal.

The filter module 104 re-samples the vector signal using a sampling rate that is greater than or equal to a Nyquist frequency of the sampled data and generates a reduced data signal. The Nyquist frequency is a frequency that is twice the frequency of the sampled data. Since rough road frequencies are typically 10 Hz or less, the Nyquist frequency is approximately 20 Hz. In a preferred embodiment the sampling rate is 32 Hz, which is above the Nyquist frequency. Thus, all harmonics of the vector signal indicative of a rough road remain in the reduced data signal. The reduced data signal generated by the filter module 104 may be characterized by the following equation:

$$y_{dr} = \sum_{k=0}^{Ns} y(kT_r)$$

where $y_{dr}$ is the reduced data signal, Tr is the sampling period, and $N_s$ is a total number of samples.

The feature space module 106 converts the reduced data signal into a feature space signal. More specifically, the feature space module converts the reduced data signal into a frequency domain signal using a Fast Fourier transform (FFT). The FFT function may be characterized by the following equation:

$$Y_f = FFT(y_b)$$

where $Y_f$ is the frequency domain signal and $y_b$ is the reduced data signal. Both $Y_f$ and $y_b$ are vectors, however, $Y_f$ is a complex vector which is obtained from the following equations:

$$Y_f = \sum_{i=1}^{N} y_b(i) w_N^{(i-1)(k-1)}$$

where $w_N = e^{(-2\Pi j)/N}$, N is the number of samples in the reduced data signal (i.e., 32), k is the number of frequency components, and $j=\sqrt{-1}$. Each component of the $Y_f$ vector is a pair of real and imaginary numbers. These complex pairs may be characterized by the following equations:

$$\text{Re} Y_f[k] = \sum_{i=1}^{N} y_b(i)\cos(2\pi ki/N)$$

$$\text{Im} Y_f[k] = -\sum_{i=1}^{N} y_b(i)\sin(2\pi ki/N)$$

where Re $Y_f[k]$ and Im $Y_f[k]$ are the real and imaginary parts of the $Y_f$ vector.

The normalization module 108 determines the energy of the frequency domain signal by summing individual components of the frequency domain signal and generates an energy signal based thereon. The energy is determined over a narrow window of frequencies, which preferably ranges from 1 to 9 Hz.

The normalization module 108 normalizes the energy signal based on the engine speed signal and generates a normalized signal. More specifically, the energy signal is divided by a normalization value that varies with engine speed. The normalization value may be a function that varies with engine speed and/or a discrete function defined by multiple ranges of engine speeds. The normalized signal has a maximum value of one and a minimum value of zero.

The rough road detection module 110 is used to detect the rough road condition. More specifically, when the normalized signal is greater than a rough road threshold, the rough road detection module 110 determines that the vehicle 10 is traversing a rough road. In a preferred embodiment, the rough road threshold is 0.5. In some applications, it may be desirable for the rough road detection module 110 to disable an engine misfire detection system to prevent detecting a false misfire.

Figure 3:
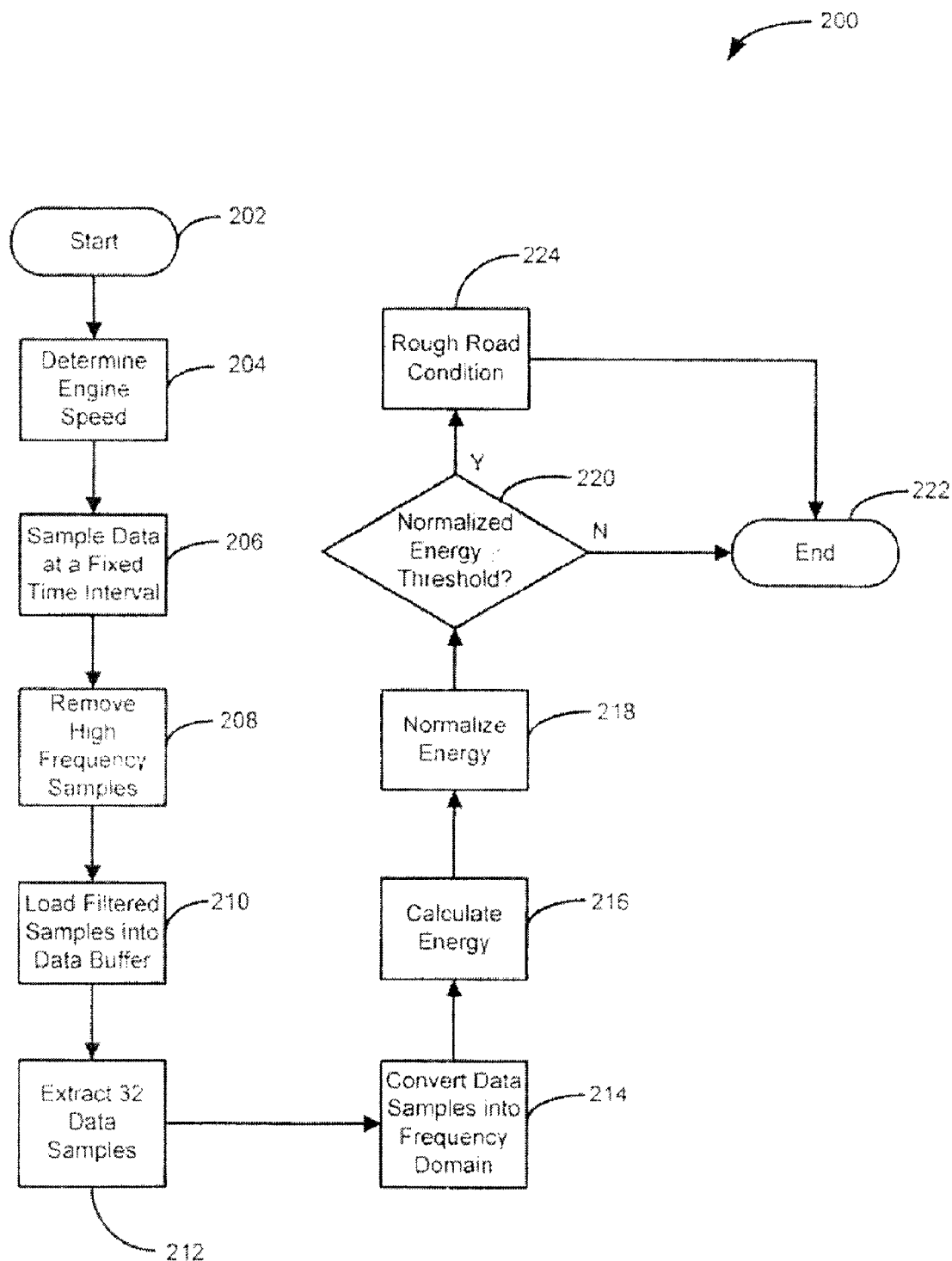
FIG. 3 is a flowchart illustrating steps executed by the rough road detection system of the present invention.

Referring now to FIG. 3, the rough road detection system implement steps generally identified at 200. The process begins in step 202 when the vehicle 10 is started. In step 204, the engine speed module 102 determines the engine speed signal. In step 206, the engine speed module 102 samples the engine speed signal using the fixed sampling rate and generates the sampled signal.

The filter module 104 removes high frequencies from the sampled signal and generates the filtered signal in step 208. In step 210, the filter module 104 assembles samples of the filtered signal for the buffer period and generates the vector signal. The filter module 104 re-samples the vector signal at the sampling rate and generates the reduced data signal in step 212. Since the buffer period is 1 second and the sampling rate is 32 Hz in the preferred embodiment, the reduced data signal contains 32 data points.

The feature space module 106 converts the reduced data signal into the feature space signal in step 214. As previously discussed, in the preferred embodiment the reduced data signal is converted into the frequency domain signal using the FFT function.

The normalization module 108 calculates the energy of the feature space signal and generates the energy signal in step 216. As previously discussed, the energy signal is determined by summing the feature space signal within the narrow window of frequencies. To improve signal to noise ratio, signals with a magnitude less than a predetermined threshold may be removed. In step 218, the normalization module 108 generates the normalized signal. As previously discussed, the normalized signal is determined by dividing the energy signal by a normalization value that varies with engine speed.

The rough road detection module 110 determines whether a rough road condition exists. More specifically, the rough road detection module 110 determines whether the normalized signal is greater than the rough road threshold in step 220. If the normalized signal is not greater than the rough road threshold, the process ends in step 222. If the normalized signal is greater than the rough road threshold, the rough road detection module 110 determines that a rough road condition exists in step 224 and the process ends in step 222.

Figure 4:
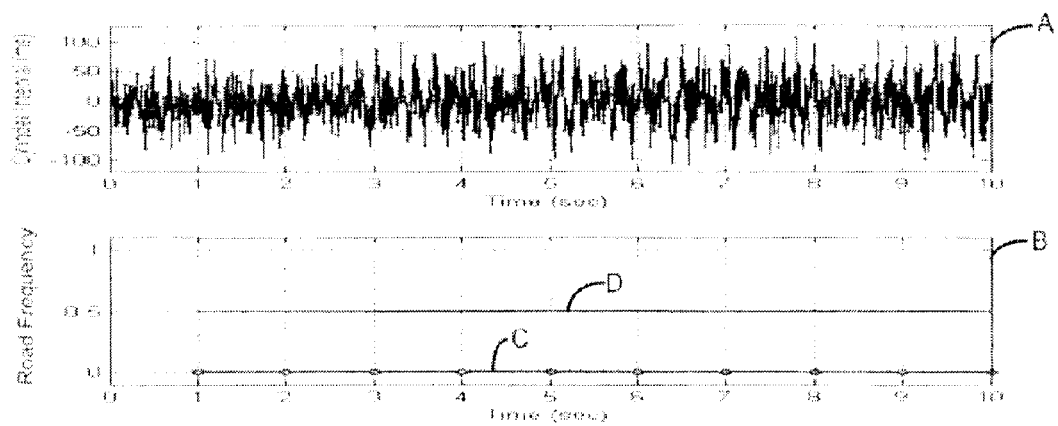
FIG. 4 depicts graphs of cylinder interval and road frequency versus time when the vehicle is traversing a smooth road.

Referring now to FIG. 4, graphs illustrating cylinder interval and road frequency versus time are shown when the vehicle 10 is traversing a smooth road. The cylinder interval is a time differential in milliseconds for the cylinder 16 to pass a reference point. More specifically, the time differential represents a difference between an expected time that the cylinder 16 will pass the reference point and an actual time that the cylinder 16 passes the reference point. As shown in graph A, the cylinder interval is generally within ±100 ms when the vehicle 10 is traversing a smooth road.

Graph B illustrates normalized road frequency versus time. Profile C represents the normalized signal that is indicative of the road frequency experienced by the vehicle 10. Profile D represents the rough road threshold. As shown in graph B, the normalized signal does not exceed the rough road threshold. Thus, the vehicle 10 is traversing a smooth road.

Figure 5:
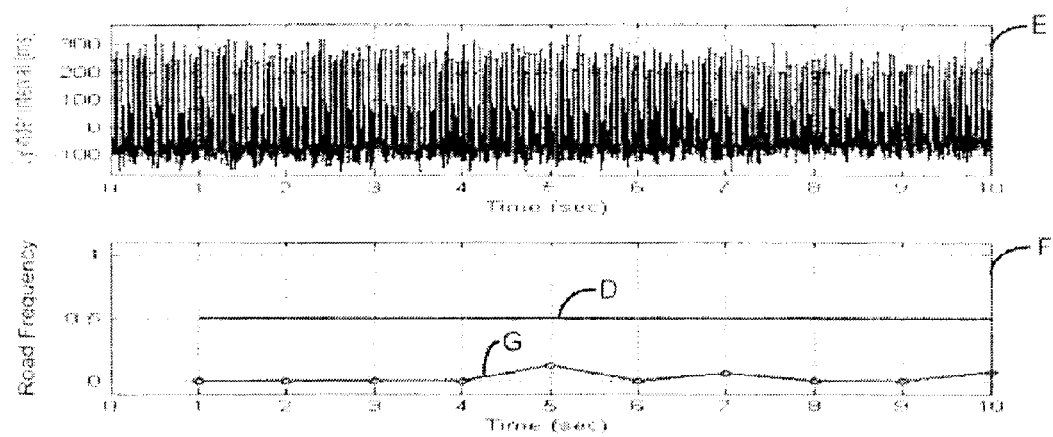
FIG. 5 depicts graphs of cylinder interval and road frequency versus time when the vehicle experiences an engine misfire.

Referring now to FIG. 5, graphs illustrating cylinder interval and road frequency versus time are shown when the vehicle 10 experiences an engine misfire. Graph E illustrates cylinder interval versus time when the vehicle 10 experiences an engine misfire on a smooth road. As shown in graph E, the variation of cylinder interval is greater than the variation of cylinder interval depicted in graph A, which may be confused with the rough road condition.

Graph F illustrates normalized road frequency versus time. Profile G represents the normalized signal indicative of the road frequency experienced by the vehicle 10. At approximately 5 seconds, the vehicle 10 experiences an engine misfire causing profile G to spike. Since, the spike in profile G does not exceed the rough road threshold (profile D) the vehicle 10 is not traversing a rough road.

Figure 6:
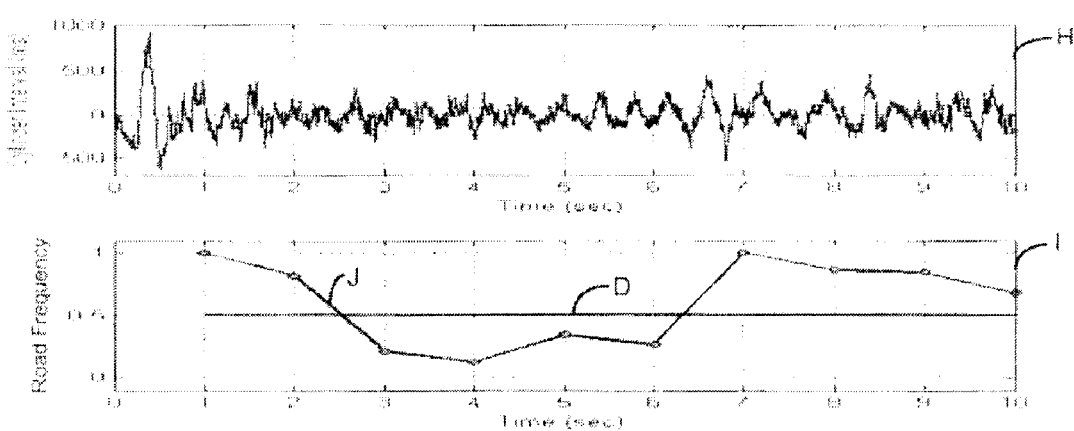
FIG. 6 depicts graphs of cylinder interval and road frequency versus time when the vehicle is traversing a rough road.

Referring now to FIG. 6, graphs illustrating cylinder interval and road frequency versus time are shown when the vehicle 10 is traversing a rough road. As shown in graph H, the variation of cylinder interval is greater than the variation depicted in graph E, which is indicative of the rough road condition.

Graph I illustrates normalized road frequency versus time. Profile J represents the normalized signal indicating the road frequency experienced by the vehicle 10. Profile J exceeds the rough road threshold (profile D) until approximately 2.5 seconds indicating that the vehicle 10 is traversing a rough road. From approximately 2.5 seconds to 6.3 seconds, profile J does not exceed the rough road threshold indicating a smooth road. At approximately 6.3 seconds, profile J exceeds the rough road threshold indicating that the vehicle 10 is traversing a rough road.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rough road detection system, comprising:
an engine speed module that generates an engine speed signal based on a crank signal;
a feature space module that generates a frequency domain signal based on said engine speed signal;
a normalization module that generates a normalized signal based on said frequency domain signal and a normalization value that varies in accordance with said engine speed signal; and
a rough road module that determines whether a rough road condition exists based on said normalized signal.

2. The rough road detection system of claim 1 wherein said rough road condition exists when said normalized signal exceeds a rough road threshold.

3. The rough road detection system of claim 2 wherein said engine speed module generates a sampled signal based on said engine speed signal.

4. The rough road detection system of claim 3 further comprising a filter module that generates a filtered signal based on components of said sampled signal that do not exceed a rough road frequency.

5. The rough road detection system of claim 4 wherein said filter module generates a vector signal based on said filtered signal.

6. The rough road detection system of claim 5 wherein said filter module generates a reduced data signal based on said vector signal.

7. The rough road detection system of claim 6 wherein said frequency domain signal is based on said reduced data signal.

8. The rough road detection system of claim 7 wherein said normalization module generates an energy signal based on said frequency domain signal.

9. The rough road detection system of claim 8 wherein said normalized signal is based on said energy signal.

10. A method to detect a rough road, comprising:
generating an engine speed signal based on a crank signal;
generating a frequency domain signal based on said engine speed signal;
generating a normalized signal based on said frequency domain signal and a normalization value that varies in accordance with said engine speed signal; and
determining whether a rough road condition exists based on said normalized signal.

11. The method of claim 10 further comprising determining that said rough road condition exists when said normalized signal exceeds a rough road threshold.

12. The method of claim 11 further comprising generating a sampled signal based on said engine speed signal.

13. The method of claim 12 further comprising generating a filtered signal based on components of said sampled signal that do not exceed a rough road frequency.

14. The method of claim 13 further comprising generating a vector signal based on said filtered signal.

15. The method of claim 14 further comprising generating a reduced data signal based on said vector signal.

16. The method of claim 15 wherein said frequency domain signal is based on said reduced data signal.

17. The method of claim 16 further comprising generating an energy signal based on said frequency domain signal.

18. The method of claim 17 wherein said normalized signal is based on said energy signal.

19. A rough road detection system, comprising:
a feature space module that generates a frequency domain signal based on a vehicle speed signal;
a normalization module that generates a normalized signal based on said frequency domain signal and a normalization value that varies in accordance with said vehicle speed signal; and
a rough road module that determines whether a rough road condition exists based on said normalized signal.

20. The rough road detection system of claim 19 wherein said rough road condition exists when said normalized signal exceeds a rough road threshold.

21. The rough road detection system of claim 19 further comprising:
a sampling module that generates a sampled signal based on said vehicle speed signal; and
a filter module that generates a filtered signal based on components of said sampled signal that do not exceed a rough road frequency, a vector signal based on said filtered signal, and a reduced data signal based on said vector signal.

22. The rough road detection system of claim 21 wherein:
said frequency domain signal is based on said reduced data signal;
said normalization module generates an energy signal based on said frequency domain signal; and
said normalized signal is based on said energy signal.

23. A rough road detection system, comprising:
an engine speed module that generates an engine speed signal based on a crank signal;
a filter module that generates a filtered signal based on said engine speed signal and a rough road frequency;
a feature space module that generates a feature space signal based on said filtered signal;
a normalization module that generates a normalized signal based on said feature space signal and a normalization value that varies in accordance with said engine speed signal; and
a rough road module that determines whether a rough road condition exists based on said normalized signal.

24. The rough road detection system of claim 23 wherein said filter module generates said filtered signal based on components of said engine speed signal that do not exceed a rough road frequency.

* * * * *